Nov. 26, 1968  J. E. HUDSON  3,412,984

METHOD AND APPARATUS FOR PARISON PREHEATING WITH A COVER

Filed June 24, 1965

INVENTOR
J. E. HUDSON
BY
ATTORNEYS 3,412,984
METHOD AND APPARATUS FOR PARISON
PREHEATING WITH A COVER
Jimmie E. Hudson, Bartlesville, Okla., assignor to Phillips
Petroleum Company, a corporation of Delaware
Filed June 24, 1965, Ser. No. 466,704
6 Claims. (Cl. 263—2)

ABSTRACT OF THE DISCLOSURE

An open topped mold has a flexible liner and a flexible cover extending across the open top. A slit in the cover allows insertion of parisons into the mold for heating. Means is provided to introduce fluid pressure between the mold and the liner so as to displace the liner and thus remove the heated parison.

---

Figure 2A:
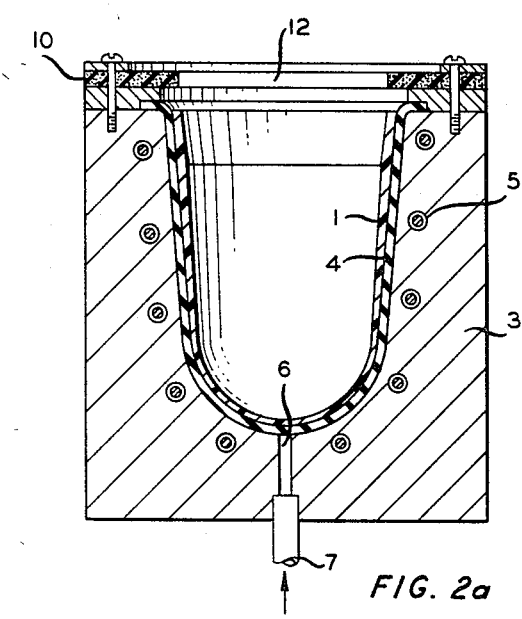

This invention relates to preheating a parison. In one of its aspects it relates to a method for preheating a parison, said method comprising placing said parison into a mold having the shape of a parison, the mold being covered with a material which retains the heat in the mold cavity and allows the parison to pass into and out of said cavity. In another of its aspects, the invention relates to an apparatus for preheating a hollow parison, the apparatus comprising a mold having a cavity suitable for positioning therein the hollow parison, the mold cavity being covered with a flexible cover having a slit therein to allow the parison to pass therethrough. In another aspect of the invention, an apparatus as previously described has a mold cover which is made from a sheet of a rubbery polymer. In a still further aspect, the apparatus as previously described having a mold cover made of a rubbery polymer, the mold cover having a single slit therein.

In Ser. No. 437,175, filed Mar. 4, 1965, now U.S. Patent 3,347,966, there is described and claimed a parison heating mold having a high thermal conductivity and having a flexible liner made of a material such as rubber which has a relatively low thermal conductivity but a higher thermal conductivity than that of the parison. According to the invention, in the aforementioned application, after a parison has been heated to a desired temperature, it is pushed out of the mold by applying a fluid pressure to the area between the flexible liner and the mold, thus causing the flexible liner to be peeled from the parison. It has been found that occasionally nonuniform heating of the parison results from convective air currents which enter the mold cavity through the opening through which the parison enters. I have now discovered that a cover, which will allow the parison to pass into and out of the mold without harming the parison, will prevent uneven heating of the parison due to deleterious convective air currents.

By various aspects of this invention, one or more, or other, of the following objects can be obtained.

It is therefore an object of this invention to provide a method and apparatus for preheating a hollow parison whereby the effects of undesirable air currents are avoided.

It is a further object of this invention to provide a parison preheating mold whereby the parison can be placed into and taken out of the mold cavity which contains a cover with a minimum of ease and without damaging the parison.

Other aspects, objects, and the several advantages of this invention are apparent to one skilled in the art from a study of this disclosure, the drawings, and the appended claims.

According to the invention, there is provided an open topped mold having a cavity conforming to the shape of the parison to be heated. The mold is provided with a flexible cover over the cavity opening. The cover, which can be made of an insulating material, provides for the placing of the parison into and removing the parison from the mold cavity without removing the cover. In a preferred embodiment of the invention, the cover contains a linear slit to allow passage of the parison therethrough. The cover can be attached to the mold at the edges of the cavity opening.

The cover can be made of any flexible material. In a preferred embodiment of the invention, the cover is made of a soft, flexible, silicone rubber. Other materials which can be used are butyl rubber and ethylene-propylene terpolymer rubber.

Generally, the cover should be thick enough so that it will retain the heat within the mold and not deform unless pressure is applied to it, yet should be thin enough so that it will deform easily when the parison passes through it. For example, a sponge rubber cover ¼" thick would be suitable.

The length of the slit will be at least as wide as the diameter of the parison Generally, the ratio of the slit length to the maximum parison diameter will be in the range of 1:1 to 1:2, preferably about 1:1.57.

The slit need not be a single line configuration. Any type of slit configuration can be used as long as the parison can pass through the cover easily without deformation and without having to remove the cover. For example, a cross configuration could be used.

Figure 2B:
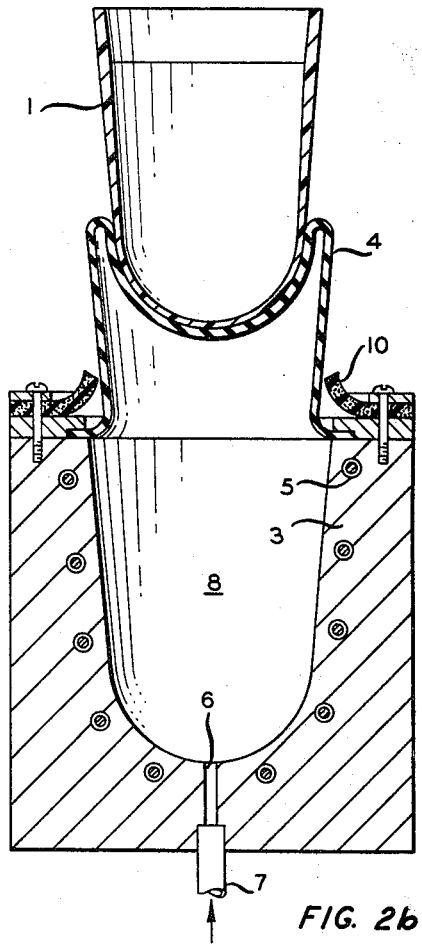
Figure 1:
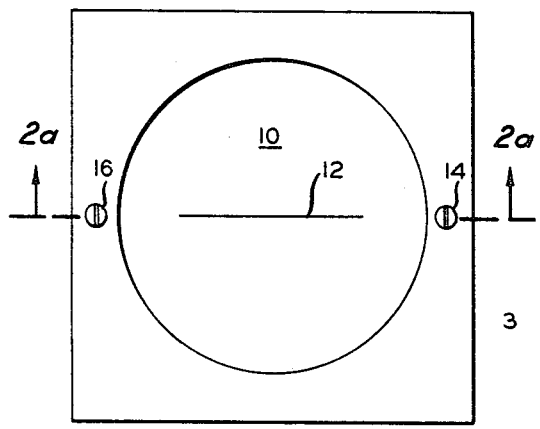

The invention can be better understood by reference to the drawings showing an embodiment of the invention in which FIGURE 1 is a top view of an apparatus according to the invention, FIGURE 2a is a section taken through line II—II of FIGURE 1; FIGURE 2b is a view similar to FIGURE 2a showing the parison being removed from the mold.

Referring now to the drawings, mold 3 of high heat conductivity, having a flexible liner 4, defines a shape suitable for heating a parison 1. Mold 3 is provided with electrical resistance elements 5 to provide means for heating the mold to a suitable temperature. Other heating means, such as a circulating fluid of heated material, can be provided instead of the resistance wires 5. A conduit 6 is connected to an air hose 7 which is adapted to provide fluid pressure to be introduced between the flexible liner 4 and the mold 3. A flexible cover 10 is placed over the mold cavity opening in mold 3. Cover 10 is provided with a slit 12 to allow the parison to pass therethrough as shown in FIGURE 2b. Cover 10 can be glued on to the top or fastened on to the top with other mechanical means such as a cover plate as shown in the drawing. The cover should be fastened onto the mold 3 in such a way as to facilitate the opening and closing of slit 12. For example, if the cover 10 were held in place at points 14 and 16, the slit 12 would open easily to allow passage of the parison as shown in FIGURE 2b. The flexible liner 4 can be made of rubber or any flexible material which has a higher heat conductivity than the parison and a substantially lower heat conductivity than that of the mold. The mold can be formed of any suitable high heat conductivity material such as aluminum, carbon steels and stainless steels, and copper.

In operation, the parison 1 can be placed into mold cavity 3 by pushing it through slit 12. The parison is then heated to a suitable temperature. Fluid pressure is then introduced through line 7 and conduit 6 to push the parison upwardly through slit 12 out of the mold. As can be seen in FIGURE 2b, the flexible liner 4 is peeled from parison 1 as the parison is pushed through slit 12 thereby deforming cover 10. The fluid pressure in the area 8 pushes the flexible liner upwardly and thus peels the flexible liner from parison 1.

It is obvious that the cover according to the invention could be used on molds other than the type shown in the drawing. For example, the cover could be used to prevent convective air currents from entering both ends of a horizontal mold in which a hollow parison was introduced in one end and taken out of the other end.

Reasonable variation and modification are possible within the scope of the foregoing disclosure, the drawing, and the appended claims to the invention, the essence of which is that there is provided a mold for preheating a hollow parison, the mold having a flexible cover over a cavity opening in the mold, the flexible cover having a means for allowing passage of the parison therethrough without removal of the cover, and without deforming the parison; and there is provided a method for heating a parison comprising placing the parison in a mold cavity, and heating the parison while the mold cavity is covered with a flexible heat retaining material.

I claim:

1. A mold for heating a hollow parison, said mold comprising a cavity for said parison, a cover of sponge rubber positioned over said cavity so that said cavity is completely enclosed, and a slit having a cross configuration in said flexible cover to allow the passage of the parison therethrough without damaging the parison and without removing the cover.

2. An apparatus for heating a preshaped parison uniformly, said apparatus comprising a high heat conductivity material mold having a cavity conforming to the shape of said parison, said mold having a means for introducing gas pressure into the bottom of said cavity; and a liner of low heat conductivity, said heat conductivity being greater than that of said parison; a sponge rubber cover over said cavity, thus enclosing said cavity, said cover having a longitudinal slit configuration at least as long as the maximum diameter of said parison so that said parison can be placed into and taken out of said cavity through said slit without removing said cover or without damaging said parison.

3. An apparatus according to claim 2 wherein said cover is fastened to the top of said mold at the edge of said cavity along a line perpendicular to said slit.

4. A method for heating a hollow parison used for blow molding hollow articles, said method comprising placing said parison into a high heat conductivity mold having a flexible, low heat conductivity liner, and having a flexible low heat conductivity cover with a slit therein, heating said mold to a temperature sufficient to heat said parison to the desired temperature and removing said parison from said mold by pushing said parison through said slit in said cover.

5. A method according to claim 4 wherein fluid pressure is applied between said mold and said liner after said parison reaches the desired temperature and said liner pushes said parison through said slit out of said mold so that said liner is peeled from said parison.

6. An apparatus for uniformly heating a preshaped parison comprising in combination:
- a mold made of a high heat conductivity material and having a cavity conforming to the shape of said parison;
- a flexible liner of low heat conductivity;
- a low heat conductivity cover made of flexible material, said cover extending completely across an open end of said cavity, said cover having a slit configuration at least as long as the maximum diameter of said parison so that said parison can be placed into and taken out of said cavity through said slit without removing said cover or without damaging said parison;
- means for introducing gas pressure into the bottom of said cavity to displace said liner; and
- means for heating said mold.

References Cited

UNITED STATES PATENTS

| | | | |
|---|---|---|---|
| 862,688 | 8/1907 | White | 263—2 |
| 1,996,564 | 5/1935 | Blanchet | 263—2 |
| 2,213,902 | 9/1940 | Daniels | 18—2 |
| 2,977,106 | 3/1961 | Duff | 263—50 |
| 3,347,966 | 10/1967 | Seefluth | 264—94 |

JOHN J. CAMBY, *Acting Primary Examiner.*